United States Patent
Kosik et al.

[11] Patent Number: 6,058,792
[45] Date of Patent: May 9, 2000

[54] AUTOMATIC CLUTCH WITH EMERGENCY STRATEGY FOR SPEED SENSOR FAILURE

[75] Inventors: Franz Kosik, Ostfildern; Thomas Grass, Urbach, both of Germany

[73] Assignee: DaimlerChrysler AG, Stuttgart, Germany

[21] Appl. No.: 09/269,285

[22] PCT Filed: Sep. 18, 1997

[86] PCT No.: PCT/DE97/02149

§ 371 Date: Mar. 25, 1999

§ 102(e) Date: Mar. 25, 1999

[87] PCT Pub. No.: WO98/13620

PCT Pub. Date: Apr. 2, 1998

[30]   Foreign Application Priority Data

Sep. 25, 1996 [DE] Germany .......................... 196 39 294

[51] Int. Cl.[7] ................................................. F16H 59/00
[52] U.S. Cl. ................................. 74/335; 477/906; 701/63
[58] Field of Search ............................. 477/906; 74/335, 74/336 R; 701/62, 63

[56]    References Cited

U.S. PATENT DOCUMENTS

| 4,849,899 | 7/1989 | Cote et al. ........................... 477/906 X |
|---|---|---|
| 5,091,854 | 2/1992 | Yoshimura et al. ................. 477/109 X |
| 5,095,774 | 3/1992 | Takahashi et al. .................. 477/906 X |
| 5,655,991 | 8/1997 | Lardy et al. .......................... 477/37 X |
| 5,928,110 | 7/1999 | Vornehm et al. ................... 477/906 X |
| 5,964,680 | 10/1999 | Salecker et al. .................... 477/906 X |
| 5,983,740 | 11/1999 | Salecker et al. ....................... 74/335 X |
| 5,992,255 | 11/1999 | Fujita et al. .............................. 74/335 |

FOREIGN PATENT DOCUMENTS

| 0 241 216 | 10/1987 | European Pat. Off. . |
|---|---|---|
| 0 244 222 | 11/1987 | European Pat. Off. . |
| 28 33 961 | 2/1980 | Germany . |
| 40 12 595 | 10/1991 | Germany . |
| 42 37 983 | 5/1994 | Germany . |

*Primary Examiner*—Charles A. Marmor
*Assistant Examiner*—Scott Lund
*Attorney, Agent, or Firm*—Evenson, McKeown, Edwards & Lenahan, PLLC

[57]    ABSTRACT

An automatic clutch between a motor vehicle engine and drive train with a manually shifted gearbox disposed on the clutch output side. Rotational speed differences between the clutch input and output detected by sensor technology are taken into consideration when the clutch is engaged. If the signals from the sensing elements for the rotational speed on the output side fail, replacement signals are calculated from other parameters.

9 Claims, 2 Drawing Sheets

AUTOMATIC CLUTCH WITH EMERGENCY STRATEGY FOR SPEED SENSOR FAILURE

BACKGROUND AND SUMMARY OF THE INVENTION

The invention concerns an automatic clutch arranged between the engine and the drive train of a motor vehicle, having a transmission which is arranged on the output side of the clutch. An adjusting unit serves for releasing and engaging the clutch and is controlled by a system of sensors taking predetermined parameters into account. The system of sensors has signalling devices for the state of the transmission as well as signalling devices arranged on the input side and output side of the clutch for sensing rotational speed and controlling the engagement of the clutch as a function of differences in speed between the input and output of the clutch. A substitute signal is generated if a speed signal fails to be obtained on the output side.

Such an automatic clutch is the subject of European Patent document EP 0 241 216 A2. According to this document, the automatic clutch is combined with an automatic transmission, so that the clutch is released only when a manually actuated operating element for the transmission is brought into an idling position or the idling position is passed through when switching over between forward and reverse travel of the vehicle. To be able to synchronize the clutch during subsequent engaging, i.e. when selecting a drive position, the speed on the output side of the transmission must be known, among other things. Should the corresponding signal fail, a substitute signal can be generated by assuming that no appreciable changes have occurred since the time at which the clutch was released. Consequently, the speed on the output side can be determined from the state of the transmission, i.e. the transmission ratio, determined before release of the clutch, together with the engine speed.

If required in the case where a service brake is actuated continuously before and after the last release of the clutch, the amount of the drop in speed before releasing the clutch can be registered and the assumption subsequently made that the effect of the service brake remained essentially the same. As a result, an analogous drop in speed on the output side of the transmission with the clutch released is then assumed in calculation.

Wherever vehicles have a transmission switched manually between various transmission stages, during the change of transmission stages the power flow between the engine and the drive wheels regularly has to be interrupted by releasing a clutch.

It is known in principle to use an automatic clutch for this purpose, i.e. the clutch is automatically released when changing the transmission stage or gear and is subsequently re-engaged. With a view to increased comfort, differences in speed existing between the clutch input and clutch output may be taken into account when engaging the clutch. There is consequently the possibility, for example, of engaging the clutch with a longer slipping phase in the event of a greater difference in speed. Moreover, the difference in speed may be taken into account in an automatic engine control, if provided, in such a way that the engine speed, and consequently the speed of the input of the clutch, are made to match the speed of the output of the clutch.

German Patent document DE 40 12 595 A1 discloses a corresponding automatic clutch. According to this document, a device for detecting intended shifting is provided such that, during manual changing of the transmission stages, a signal representing the new transmission stage is generated before this transmission stage has been fully activated. In connection with the signals of a sensor sensing the speed of the transmission input, and consequently of the clutch output, the speed of the transmission input or clutch output to be expected when the new transmission stage is fully activated is then calculated. It is assumed that the vehicle does not change its travelling speed, or that it changes only insignificantly, during the change of transmission stages.

According to German Patent document DE 28 33 961 C2, it is envisaged to control an automatic clutch during starting of the vehicle such that the engine speed remains within a predetermined range, which is dependent on the loading of the vehicle, i.e. on the position of the gas pedal. During driving, the clutch is to be automatically actuated such that a difference in speed between the clutch input and clutch output is reduced over time on the basis of a predetermined gradient of the change in the difference in speed.

For determining the speeds of the clutch on the input side and output side, signalling devices provided in any case on the vehicle are generally used. The speed on the input side of the clutch thus corresponds to the engine speed, which is regularly registered for the purpose of engine control. The speed on the output side of the clutch can be determined from the transmission ratio of the selected transmission stage and the speeds of the drive wheels, which in the case of modern vehicles are regularly combined with speed pickups, in order for example to be able to control an anti-lock system of the brake system and/or a traction control system.

The corresponding signalling devices operate with great reliability. Nevertheless, even with operational signalling devices, the possibility of the signals desired for clutch control not being available because of faults occurring on the signal lines or at their contacts, cannot be completely ruled out.

Therefore, it is the object of the invention to achieve good clutch control even if signals fail to be obtained.

This object is achieved according to the invention by the transmission being able to be manually shifted between different transmission stages and provided with a sensor for the respectively selected transmission stage. The clutch is automatically released when there is a change of transmission stages. When a speed signal on the output side fails to be obtained, the speed ($U_{after}$) of the clutch output occurring after a change of transmission stages before engaging the clutch released during this change of transmission stages is determined from the speed ($U_{before}$) of the clutch input coinciding with the engine speed and determinable before releasing the clutch for the change of transmission stages, as well as from the transmission ratio ($a_{before}$) before the change of transmission stages and the transmission ratio ($a_{after}$) after the change of transmission stages, corresponding to $$a_{before}U_{after}=a_{after}U_{before}.$$

The invention is based on the general idea of determining in an emergency the speed of the clutch output, with the clutch released, from parameters which were last applied with the clutch engaged. It is taken into account here that, with the clutch engaged, the speed of the transmission output, and similarly the speed of the drive wheels, can be calculated from the engine speed if the transmission ratio between the engine and the transmission output is known. As a result, this is synonymous to saying that it must be known which transmission stage has been selected.

In most cases of a transmission stage change, the travelling speed of the vehicle remains virtually constant while the clutch is in the released state. This is synonymous to saying that the speed of the transmission output also remains constant to the greatest extent. With the speed of the transmission output remaining constant, however, when there is a change of transmission stage, only a change in speed which is unequivocally determined by the change in the transmission ratio of the transmission which occurred during the changing of the transmission stages can occur at the transmission input, and consequently at the clutch output.

With the clutch engaged, the clutch input and clutch output have the same speeds, corresponding to the engine speed. If the clutch is then released with the travelling speed remaining the same, and accordingly the speed of the transmission output remaining the same, and the transmission stage is changed, then the speed of the clutch input must change in a way corresponding to the changing of the transmission ratio.

These facts are utilized in the case of the invention to allow a substitute signal for the speed of the clutch output to be determined if need be after releasing the clutch.

In the case of actuating a service brake of the vehicle, the gradient of the engine speed drop brought about by the braking operation can be determined before releasing the clutch. An analogous gradient can then be determined from this for the drop in speed of the transmission output.

If the braking operation is then continued after releasing the clutch, the aforementioned gradient for the speed of the transmission output can also be taken into account after releasing the clutch, throughout the braking operation, so that an exact value for the speed of the clutch output can be determined in the case of a braking deceleration which actually remains the same.

In the case of a multitude of braking operations, such a precondition exists, at least approximately, so that the substitute signal coincides comparatively well with the actual speed of the clutch output.

Otherwise, with regard to preferred features of the invention, reference is made to the claims and the following explanation of the drawing, on the basis of which a particularly preferred embodiment of the invention is described.

DETAILED DESCRIPTION OF THE DRAWING

Figure 1:
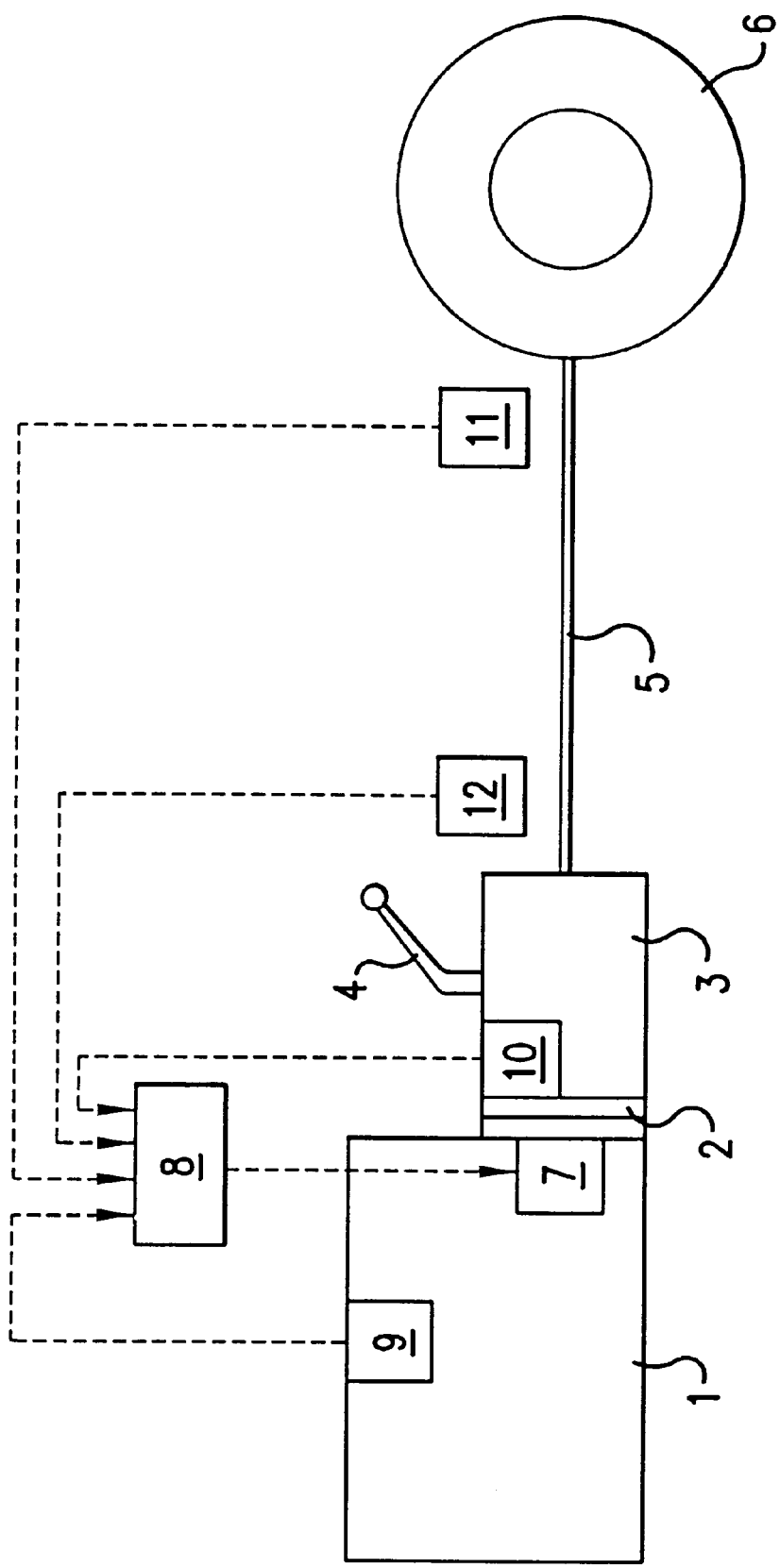
FIG. 1 shows a schematic representation of a drive train of a motor vehicle as well as the components essential for the clutch control according to the invention.

An internal combustion engine 1 is connected in drive terms via an automatically actuated clutch 2 and a transmission 3. The transmission stages or gears of the transmission are changed by manual actuation of a shift lever 4. The transmission is coupled with a drive shaft 5, for example a cardan shaft, to drive wheels 6 of a motor vehicle, otherwise not represented in any more detail.

The actuation of the clutch 2 takes place automatically via a motorized adjusting unit 7. For controlling the adjusting unit, there is provided a control circuit 8, which takes diverse parameters into account during actuation of the adjusting unit 7.

For this purpose, the control circuit 8 is connected, among other things, to an engine control 9, which feeds the control circuit 8, among other things, signals for the engine speed. A signalling device 10 at the transmission 3 or at the shift lever 4 reports the respectively selected transmission stage. Speed pickups 11 assigned to the wheels 6 report the respective wheel speeds. A signalling device 12 indicates whether a service brake of the vehicle is actuated. This signalling device 12 may be formed by a brake light switch which is switched on when the brake is actuated and is generally controlled by a brake pedal actuated by the driver.

If, in the case of normal operation, the clutch 2 is released for a change of transmission stage of the transmission 3, the control circuit 8 "knows" before the renewed engagement of the clutch 2 on the one hand the speed of the clutch input and on the other hand the speed of the clutch output. The speed of the clutch input corresponds to the engine speed, which is reported by the engine control 9. The speed of the clutch output is determined by the wheel speed, reported by the speed pickups 11, and the respectively selected transmission stage, which is reported by the signalling device 10.

In the following, it will be assumed that the signals of the speed pickups 11 are no longer available.

Before releasing the clutch 2, if the clutch 2 is operating faultlessly it can be assumed that the clutch input and clutch output are at the same speed. If the clutch 2 is now released for changing the transmission stage and it can be assumed that the travelling speed of the vehicle, and consequently the speed of the wheels 6 and of the output of the transmission 3 connected thereto in drive terms, remain constant, the speed of the clutch output with the clutch 2 released can change only in a way corresponding to the changes in the transmission ratio occurring during changing of the transmission stages. Thus, if the transmission ratio before changing the transmission stage has the value $a_{before}$ and after changing the transmission stage has the value $a_{after}$, the following applies for the speeds $U_{before}$ and $U_{after}$:

$$a_{before}U_{after}=a_{after}U_{before},$$

where $U_{before}$ corresponds to the engine speed before releasing the clutch 2 and where $U_{after}$ corresponds to the clutch output speed after the change of transmission stage.

Now suppose that a braking operation which is initiated before releasing the clutch 2 and ended after releasing the clutch 2 takes place.

The actuation of the brake is reported by the signalling device 12. The control circuit 8 can then determine the gradient of the drop in engine speed before release of the clutch 2. This gradient is proportional to the braking deceleration. If it is then assumed that the braking deceleration remains essentially constant, the speed of the transmission output must change with a gradient which stays the same as long as the braking operation lasts, even after release of the clutch 2. If this effect is additionally taken into account, it is possible even in the case of a braking operation with a change of transmission stage and the associated release of the clutch 2 for a relatively exact value to be determined for the speed of the clutch output with the clutch 2 released.

Figure 2:
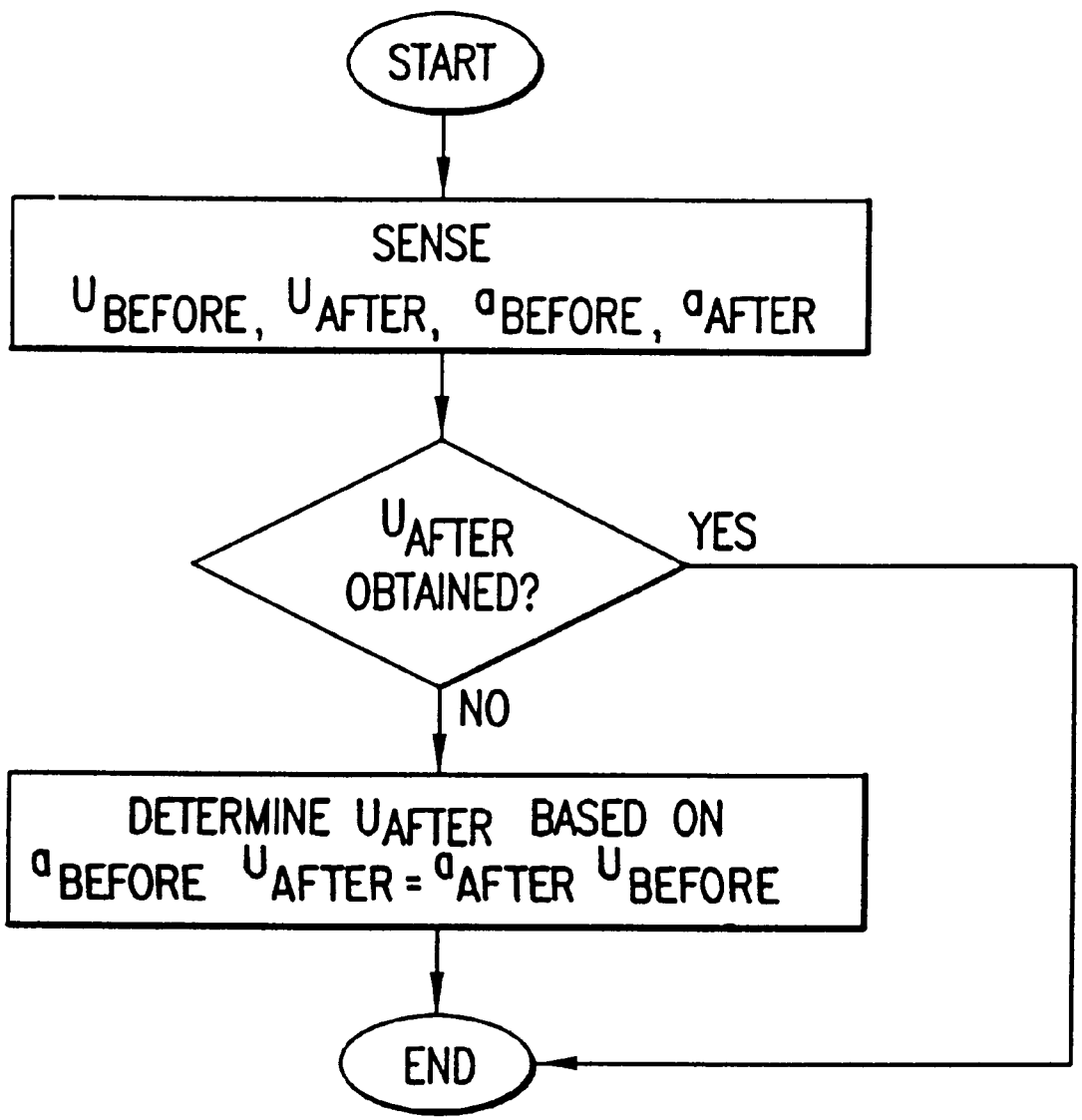
FIG. 2 shows an emergency strategy according to the present invention.

The invention provides an advantageous emergency strategy for when the signals for the wheel speed or for the speed of the clutch output fail to be obtained (see FIG. 2).

We claim:

1. An automatic clutch arranged between an engine and a drive train of a motor vehicle having a transmission on an output side of the clutch, comprising:

an adjusting unit which releases and engages the clutch;

a control unit including a plurality of sensors, said control unit controlling the adjusting unit, the plurality of sensors factoring predetermined parameters into account and including signalling devices signalling a transmission state and a rotational speed state of the clutch, said control unit controlling the engaging of the clutch as a function of differences in the rotational speed between an input and an output of the clutch, a substitute signal being generated if a speed signal fails to be obtained on the output side;

wherein, when the speed signal on the output side of the clutch fails to be obtained, a speed ($U_{after}$) of the clutch output occurring after a change of the transmission state and before engaging the clutch, which is released during a respective transmission state change, is determined from a speed ($U_{before}$) of the clutch input coinciding with an engine speed and determinable before releasing the clutch for the transmission state change, as well as from a transmission ratio ($a_{before}$) before the transmission state change and a transmission ratio ($a_{after}$) after the transmission state change.

2. The automatic clutch according to claim 1, wherein the determination of the speed ($U_{after}$) of the clutch output occurring after the transmission state change occurs in accordance with the following:

$$a_{before} U_{after} = a_{after} U_{before},$$

where $a_{before}$ is the transmission ratio before the transmission state change, $U_{after}$ is the speed of the clutch output occurring after the change of the transmission state and before engaging the clutch, $a_{after}$ is the transmission ratio after the transmission state change, and $U_{before}$ is the speed of the clutch input coinciding with the engine speed and determinable before releasing the clutch for the transmission state change.

3. A method of operating an automatic clutch arranged between an engine and a drive train of a vehicle having a transmission, an adjusting unit serving to release and engage the clutch in accordance with a control system including a plurality of sensors, the method comprising the acts of:

determining whether a speed signal on an output side of the clutch is not obtained; and determining a speed ($U_{after}$) of the output side of the clutch occurring after a transmission stage change and before engagement of the clutch, which is released during the transmission stage change, from a speed ($U_{before}$) of an input side of the clutch coinciding with an engine speed and determinable before releasing the clutch for the transmission stage change, as well as from a transmission ratio ($a_{before}$) before the transmission stage change and a transmission ratio ($a_{after}$) after the transmission stage change in accordance with the following:

$$a_{before} U_{after} = a_{after} U_{before},$$

where $a_{before}$ is the transmission ratio before the transmission stage change, $U_{after}$ is the speed of the output side of the clutch occurring after the transmission stage change and before engagement of the clutch, $a_{after}$ is the transmission ratio after the transmission stage change, and $U_{before}$ is the speed of the input side of the clutch coinciding with the engine speed and determinable before releasing the clutch for the transmission stage change.

4. An automatic clutch arranged between an engine and a drive train of a motor vehicle having a transmission which is arranged on an output side of the clutch, comprising:

an adjusting unit which serves for releasing and engaging the clutch and is controlled by a system of sensors taking predetermined parameters into account, the system of sensors having signalling devices for signalling a state of the transmission as well as signalling devices arranged on an input side and the output side of the clutch for sensing rotational speed and controlling the engaging of the clutch as a function of differences in speed between the input and output sides of the clutch, a substitute signal being generated if a speed signal fails to be obtained on the output side, wherein the transmission is adapted to be manually shifted between different transmission stages and is provided with a sensor for sensing a respectively selected transmission stage, the clutch being automatically released when there is a change of transmission stages, and further wherein, when the speed signal on the output side fails to be obtained, a speed ($U_{after}$) of the output side of the clutch occurring after the change of transmission stages and before engaging of the clutch, which is released during the change of transmission stages, is determined from a speed ($U_{before}$) of the input side of the clutch coinciding with an engine speed and determinable before releasing of the clutch for the change of transmission stages, as well as from a transmission ratio ($a_{before}$) before the change of transmission stages and a transmission ratio ($a_{after}$) after the change of transmission stages, corresponding to $$a_{before} U_{after} = a_{after} U_{before},$$

where $a_{before}$ is the transmission ratio before the change of transmission stages, $U_{after}$ is the speed of the output side of the clutch occurring after the change of transmission stages and before engaging of the clutch, $a_{after}$ is the transmission ratio after the change of transmission stages, and $U_{before}$ is the speed of the input side of the clutch coinciding with the engine speed and determinable before releasing of the clutch for the change of transmission stages.

5. The clutch as claimed in claim 4, wherein the system of sensors has a signalling device for an actuated service brake of the motor vehicle and, when the substitute signal is generated in the case of a service brake being actuated continuously before and after the last release of the clutch, a drop-in-speed gradient which remains the same during use of the brake is taken as a basis for the speed of the output side the clutch.

6. The clutch as claimed in claim 5, wherein the gradient of the drop in speed of the output side of the clutch on brake actuation is determined from a drop in engine speed caused by the brake actuation before releasing the clutch.

7. The clutch as claimed in claim 6, wherein an automatic engine control is provided which has the effect, when the clutch is engaged, of making the engine speed match at least one of the speed of the output side of the clutch and a speed represented by the substitute signal.

8. The clutch as claimed in claim 5, wherein an automatic engine control is provided which has the effect, when the clutch is engaged, of making the engine speed match at least one of the speed of the output side of the clutch and a speed represented by the substitute signal.

9. The clutch as claimed in claim 4, wherein an automatic engine control is provided which has the effect, when the clutch is engaged, of making the engine speed match at least one of the speed of the output side of the clutch and a speed represented by the substitute signal.

* * * * *